(No Model.)

E. G. CONE & D. R. CLOSE.
MAGAZINE CAMERA.

No. 558,356. Patented Apr. 14, 1896.

Attest:
H. A. Nott
M. H. Holmes

Inventors:
E. G. Cone,
D. R. Close,
by Robert Burns
Atty.

UNITED STATES PATENT OFFICE.

EDWARD G. CONE AND DORR R. CLOSE, OF CHICAGO, ILLINOIS.

MAGAZINE-CAMERA.

SPECIFICATION forming part of Letters Patent No. 558,356, dated April 14, 1896.

Application filed October 21, 1895. Serial No. 566,407. (No model.)

*To all whom it may concern:*

Be it known that we, EDWARD G. CONE and DORR RALF CLOSE, citizens of the United States, residing at Chicago, in the county of Cook and State of Illinois, have invented a certain new and useful Improvement in Magazine-Cameras; and we do hereby declare the following to be a full, clear, and exact description of the same, reference being had to the accompanying drawings, forming a part of this specification.

This invention relates to that class of photographic-plate holders for use in portable cameras in which a series of negative plates are supported, so as to be capable of successive exposure; and the present improvement has for its object to provide a simple and efficient arrangement and construction of parts whereby the series of four independent plate-holders of the present improvement are adapted for ready and convenient manipulation from a covered or closed position to one of exposure and then back again to a covered or closed position in a consecutive manner, as will hereinafter more fully appear, and be more particularly pointed out in the claims.

We attain such object by the arrangement of parts illustrated in the accompanying drawings, in which—

Figure 1:
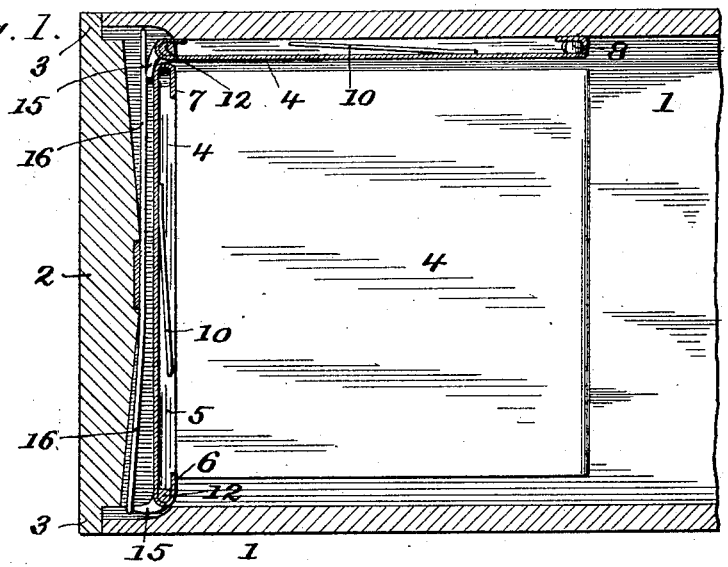
Figure 2:
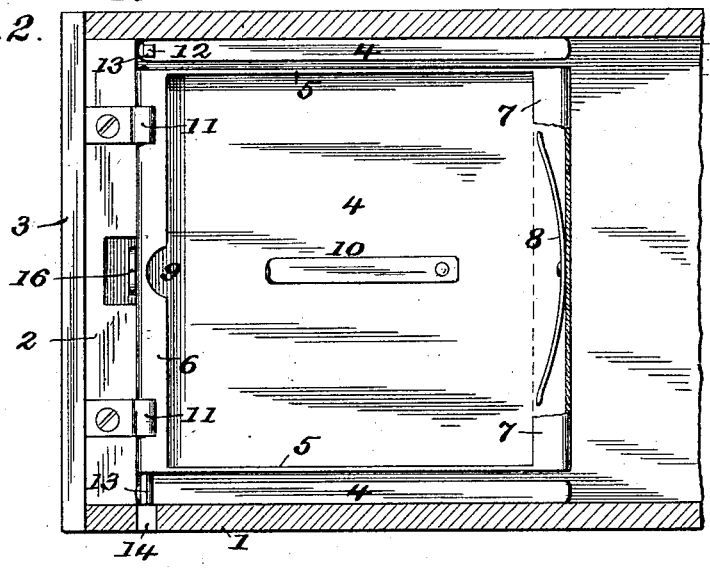
Figure 3:
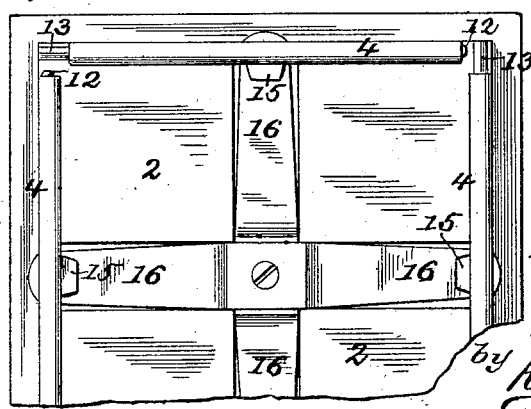

Figure 1 is a longitudinal section of the improved plate-holder in position in the rear of the camera-box; Fig. 2, a side elevation of the same with the walls of the camera-box in section; Fig. 3, an end elevation of the present improved plate-holder.

Similar numerals of reference indicate like parts in the several views.

Referring to the drawings, 1 represents the rear portion of a camera-box made open-ended, so as to receive the body portion of the plate-holder by which it is closed.

2 represents the body portion of the plate-holder, of a square formation, fitting the end of the camera-box and having a marginal flange 3, by which its proper relative position, as well as of the plate-holders proper, is assured with relation to the lens of camera.

4 are the plate-holders proper, four in number, and each provided with marginal side flanges 5 5 and with end flanges 6 and 7, that overhang in the form of lips, so as to constitute holding-pockets for the upper and lower ends of the sensitive photographic plate. Within the lower pocket is arranged the usual spring 8, against which the sensitive plate rests in a yielding manner, so that the sensitive plate can be pushed down in such pocket a sufficient distance to admit of the opposite end of the sensitive plate being introduced into the upper pocket, after which the spring by its resiliency holds the plate in proper position within the upper and lower pockets.

9 is a finger-notch in the upper flange for convenience in removing the photographic plate from the holder.

10 is a spring upon the forward face of the holder for the purpose of forcing the photographic plate outward against the holding-lips of the flanges 6 and 7, so as to insure a firm holding of such plate in proper position.

The flanges 5 5 and 6 and 7 are on a common plane, so that they will, in the covered or closed condition of the plate-holder, lie closely against the inner wall of the camera-box, so as to exclude all light from the contained photographic plates.

Each of the series of plate-holders 4 is hinged at an edge of the square supporting base or body portion 2 by hinge-lugs 11, and rods 12 are fixed to the plate-holders 4, said rods having one of their ends 13 squared or non-circular, so as to receive a suitable operating hand-key and be capable of manipulation by hand, so as to turn the plate-holder from its covered position to a position of exposure, and vice versa.

The camera-box is provided with openings 14, registering with the squared ends 13 to admit of the introduction of the operating hand-key heretofore described.

15 is a laterally-projecting lug on the bottom of each plate-holder, adapted to bear against a spring 16, secured to the base 2, the action of which is to hold the plate-holder in either of its two positions in a firm manner, being, however, capable of yielding to the force exerted by the operator in changing the position of the plate.

We are aware that prior to our invention plate-holders have been arranged in tiers in upper part of the camera, that are adapted to swing serially into an exposed position, and subsequently swing into the lower part of the camera in a pile or tier, and also that a plate-holder and focusing glass plate, secured rigidly at right angles to each other and hinged within the camera-body, have been proposed prior to our invention. We therefore make no broad claim to either of such constructions; but,

Having thus fully described our said invention, what we claim as new, and desire to secure by Letters Patent, is—

1. The herein-described plate-holder for cameras, the same comprising a suitable supporting-base, having a series of sides, and a series of plate-holders hinged singly to the different sides of the base, and adapted to normally occupy a longitudinal position in the camera in contact with the walls thereof and capable of being swung serially into a common transverse focal position, substantially as set forth.

2. The herein-described plate-holder for cameras, the same comprising a suitable supporting-base having a series of sides, a series of plate-holders hinged singly to the different sides of the base and adapted to normally occupy a longitudinal position in the camera in contact with the walls thereof, and capable of being swung serially into a common transverse focal position, and means for holding such plate-holders in either position, the same consisting of lateral lugs 15, on the plate-holders, and springs 16, on the supporting-base, substantially as set forth.

3. The herein-described plate-holder for cameras, the same comprising a supporting-base, a series of plate-holders hinged to the outer sides or edges of the same by means of pivot-lugs, and pivot-rods that are fixed to the plate-holders and provided with non-circular operating ends, substantially as set forth.

4. The herein-described plate-holder for cameras, the same comprising a suitable supporting-base having a series of sides, and a series of plate-holders hinged singly to the different sides of the base, and adapted to normally occupy a longitudinal position in the camera, in contact with the walls thereof, and capable of being swung serially into a common transverse focal position, such plate-holders being provided with marginal side flanges 5, 5, and top and bottom holding-flanges 6 and 7, the top of such flanges being arranged on a common plane, so as to present a plane surface to fit closely against the camera-wall, when the plate-holders are in their non-exposed position, substantially as set forth.

In testimony whereof witness our hands this 17th day of October, 1895.

EDWARD G. CONE.
    DORR R. CLOSE.

In presence of—
 ROBERT BURNS,
 H. A. NOTT.